April 21, 1942.     R. H. WHITELEY     2,280,462
OIL CUP
Filed Jan. 11, 1940     2 Sheets-Sheet 1
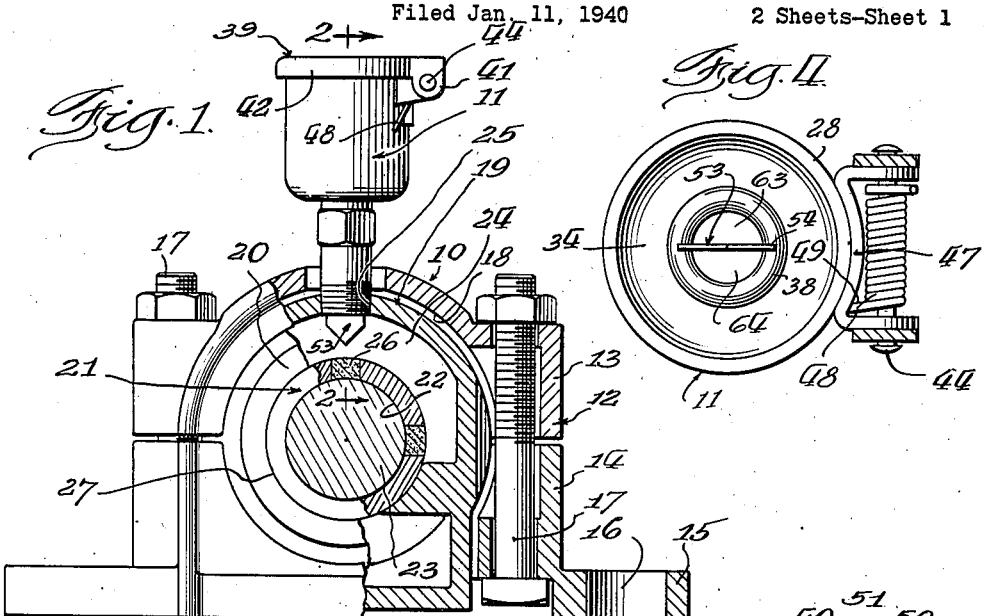
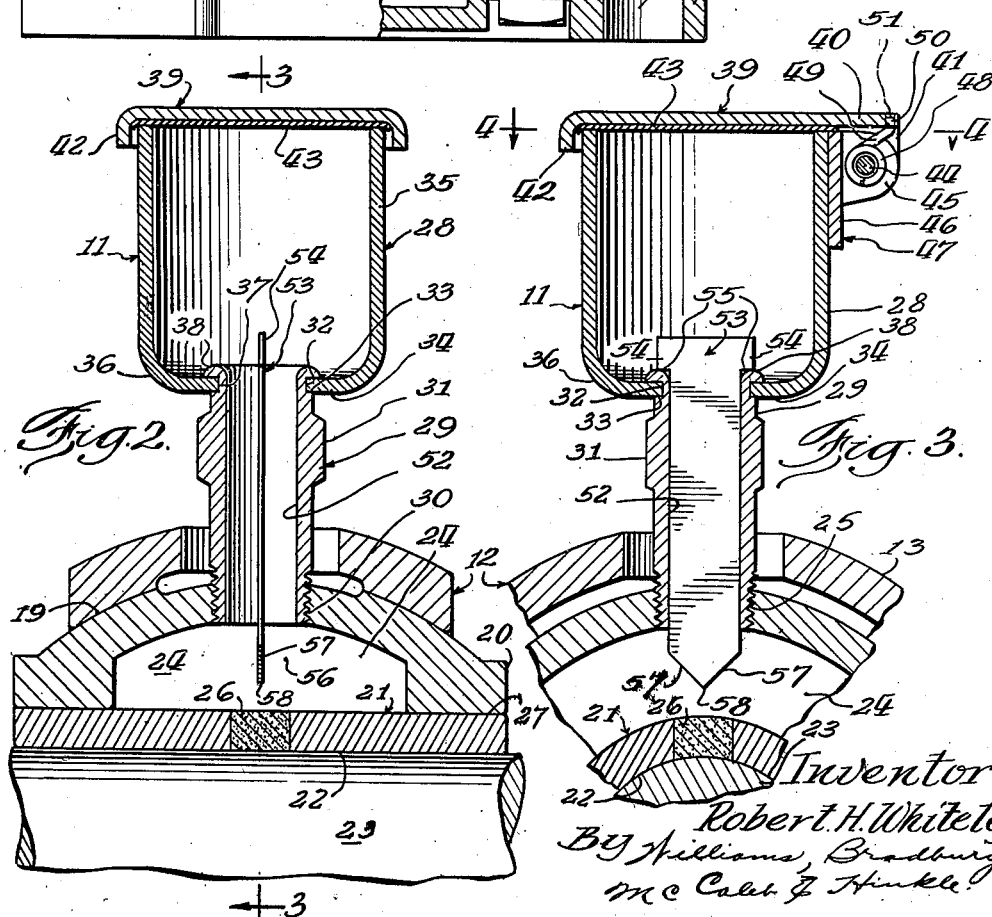
Inventor
Robert H. Whiteley
By Williams, Bradbury,
McCaleb & Hinkle
Attys.

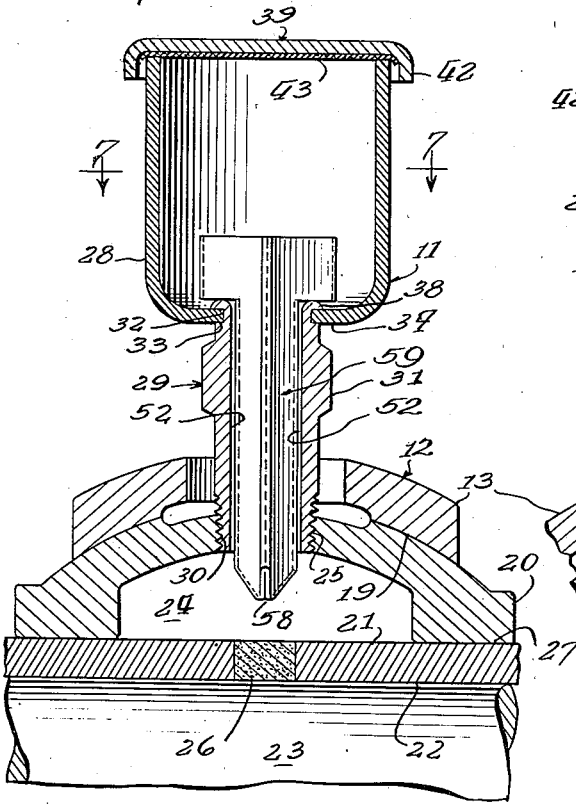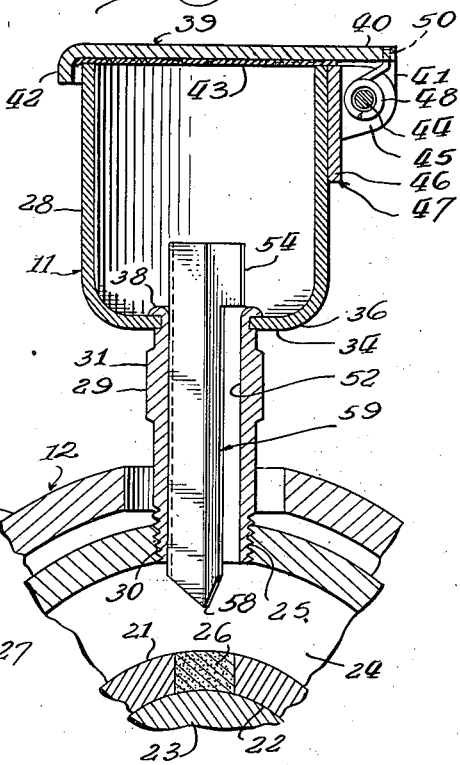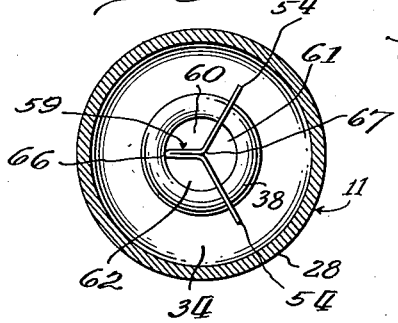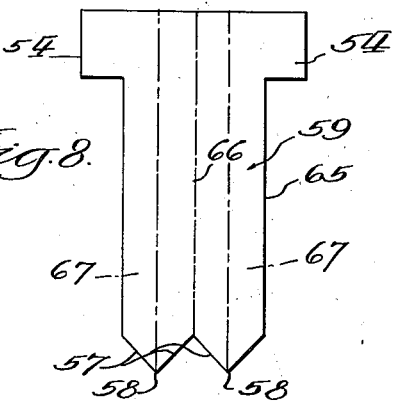

Patented Apr. 21, 1942

2,280,462

UNITED STATES PATENT OFFICE 2,280,462

OIL CUP

Robert H. Whiteley, Oak Park, Ill., assignor to Randall Graphite Products Corporation, Chicago, Ill., a corporation of Delaware Application January 11, 1940, Serial No. 313,333

11 Claims. (Cl. 184—65)

The present invention relates to oil feeding devices, and is particularly concerned with feeding devices in the form of oil cups of the type having a chamber adapted to be filled with lubricant, and having a discharge conduit.

One of the objects of the invention is the provision of an improved lubricating device by means of which the difficulty of air binding in oil cups and conduits is eliminated.

Another object of the invention is the provision of an improved lubricating device having a conduit which is provided with means for venting the air bubbles which might otherwise cause the conduit to become air-bound, and for effectively assuring the continuous flow of lubricant through the conduit.

Another object of the invention is the provision of an improved lubricating device having a conduit which is provided with means for venting the air bubbles and means which assure the movement of the air bubbles from the end of the conduit by providing an unstable position for any air bubble which might exist at the end of the lubricant conduit.

Another object of the invention is the provision of an improved oil cup from which the possibility of air binding is eliminated, which is simple in structure, capable of economical manufacture and sale, and adapted to be used for a long period of time without necessity for repair or replacement of any of its parts.

Other objects and advantages of the invention will be apparent from the following description and the accompanying drawings, in which similar characters of reference indicate similar parts throughout the several views.

Referring to the two sheets of drawings which accompany the specification:

Fig. 1 is a vertical elevational view in partial section of a bearing of the pillow block type, provided with an oil cup constructed according to the invention;

Fig. 2 is a fragmentary sectional view, taken on the plane of the line 2—2 of Fig. 1, looking in the direction of the arrows;

Fig. 3 is a similar sectional view, taken on the plane of the line 3—3 of Fig. 2, looking in the direction of the arrows;

Fig. 4 is a plan view of the interior of the oil cup, taken on the plane of the line 4—4 of Fig. 3, looking in the direction of the arrows;

Fig. 5 is a view similar to Fig. 2 of a modification;

Fig. 6 is a view similar to Fig. 3 of the modification illustrated in Fig. 5;

Fig. 7 is a sectional view, taken on the plane of the line 7—7 of Fig. 5;

Fig. 8 is a plan view of the pattern used for making the baffle of Figs. 5 to 7.

The present oil cup is peculiarly adapted to be used with bearings of the reservoir type when it is equipped with the baffle of the specific construction shown, which projects from the lower end of the oil conduit.

In some other embodiments of the invention the baffle might be made shorter so that it will not project from the oil conduit and thus be used where there is no room for a projecting point.

Referring to Fig. 1, 10 indicates in its entirety the assembly, including an oil cup 11 and a pillow block bearing 12. The pillow block bearing is of the type having a pair of complementary supporting members 13, 14, one of which has a pair of attaching flanges 15 provided with apertures 16. The two supporting members 13, 14 have through bores for passing a pair of bolts 17, which may clamp them together, and these two supporting members are provided with internal partially spherical surfaces 18 for receiving a ball shaped reservoir member 19. The partially spherical surfaces 18 may be in the form of a pair of parallel spherically surfaced tracks engaging complementary parts of the ball 19, as shown in my prior application, Serial No. 183,021, filed January 3, 1938, Fig. 12, which is hereby incorporated by reference thereto; that is, the ball 19 is supported for a limited universal movement.

The ball 19 comprises a member having partially spherical surfaces located to engage the surfaces 18 in the supporting members 13 and 14, and it preferably has a pair of inwardly extending flanges 20, which engage a cylindrical bearing member 21, having an inner cylindrical bearing surface 22 for engaging the shaft 23.

The bearing member 21 and the ball 19 together form a reservoir 24, which has a threaded filling aperture 25, and the bearing 21 is provided with a plurality of apertures which are filled with baked porous compound in the form of plugs 26, which conduct lubricant from the reservoir 24 to the bearing surface 22.

When the supporting members 13, 14 are assembled, they have through bores 27 at each end for passing the ends of the bearing 21 and the shaft 23. The oil cup 11 may be of any conventional construction in so far as its oil chamber 28 and oil conduit 29 are concerned.

In the embodiment selected to illustrate the invention, the oil conduit consists of a metal tube, open at both ends, and having its lower end threaded at 30, with pipe threads to be received in the threaded bore 25 of the reservoir 24.

The threaded end 30 of the conduit 29 preferably does not project into the space of the reservoir 24, but terminates in the bore 25. Where the threaded end projects into the reservoir 24, there is a tendency to form an air trap around the end of the pipe 29 in the reservoir 24.

The conduit 29 has a non-circular portion 31, which is usually hexagonal, and it is formed with a reduced cylindrical portion 32 and an annular shoulder 33, which engages the lower or end wall 34 of the oil chamber 28. The oil chamber 28 may consist of a cylindrical metal member having the cylindrical side walls 35 and the flat end wall 34, which are joined by the rounded lower corner 36. The end wall 34 has a centrally located bore 37 for receiving the reduced cylindrical portion 32 of the oil conduit 29. The oil conduit 29 may be spun over at 38 so that the end wall 34 of the oil chamber 28 is clamped between the parts 33 and 38.

The oil chamber 28 is preferably provided with a cover 39, which may be of a stamped metallic member of generally circular shape, having a radially projecting flange 40 that is used to support the pintle flanges 41 depending from flange 40 at one side of the oil chamber or housing 28.

The cover 39 is also preferably provided with a depending border flange 42, which is slightly spaced from the outside wall 35 of the housing 28, and a gasket 43 may be secured to the under side of the cover inside the flange 42 by means of suitable adhesive.

The gasket 43 may consist of any suitable material adapted to resist deterioration by oil or other lubricants, such as, for example, a felt gasket. The depending pintle flanges 41 have apertures for receiving the pin or pintle 44, and the pintle flanges 41 are adapted to engage outside a pair of pintle flanges 45 that extend radially outward, and are carried by the body 46 of a pintle bracket 47.

The pintle or pin 44 extends through the four flanges of 41, 45, and is riveted over at both ends, or provided with a head at one end and riveted over at the other. The cover may be urged to closed position by a helical coil spring 48, which is coiled about the pintle 44, and has one end 49 extending tangentially downward to engage the side of the oil cup or the bracket 47.

The other end of the coil spring extends tangentially from the coil, as at 49, and is provided with a bent portion 50 at its extreme end for engaging in a slot 51 in the edge of the cover 39. The spring is tensioned between the cover and the housing so that it urges the cover in a counter-clockwise direction in Fig. 3, and tends to keep the cover closed.

The pintle bracket 47 may be secured to the wall of the housing 28 by soldering, brazing, welding, or any convenient fastening means. The complete assembly is preferably galvanized overall, before it is assembled, to eliminate any possibility of corrosion.

The oil conduit 29 has a substantially cylindrical passageway 52, which extends from the oil chamber 28 to the reservoir 24. This conduit is provided with a baffle 53, which may consist of a thin sheet metal member of sufficient width, as shown in Fig. 3, to traverse the diameter of the cylindrical passageway 52. The baffle 53 thus forms a partition, dividing the conduit 52 into two halves or two conduits. In order to retain the partition 53 in place, it may have a tight frictional fit in the passageway 52, but it is also preferably provided with one or more radially projecting flanges 54 at the top for engaging the spun flange 38. That is, the flanges 54 have shoulders 55 that engage the upper end of the pipe 29.

The baffle 53 is preferably made of relatively thin stock, as it is not subjected to any force which might change its shape, and the thinner the stock the more room is left in the passageway 52. The baffle 53 preferably extends beyond the lower end 56 of the passageway 52 into the reservoir 24, where it is provided with a pair of diagonal edges 57, joining at the point 58.

The purpose of extending into the chamber or reservoir 24 is to assure the elimination of bubbles from the reservoir 24, as well as to prevent air binding in the conduit 29. In some embodiments of the invention, where the oil cups are used without a discharge into a reservoir, the pointed end 58 may terminate inside the conduit 29.

Referring to Figs. 5 to 7, these figures show a modification, in which a baffle 59 is provided for dividing the passageway 52 into three separate passages 60, 61, 62, as distinguished from the two passages 63, 64 of Fig. 4.

The baffle 59 may be made according to the pattern shown in Fig. 8, having an elongated body 65, which is approximately twice as wide as the diameter of the passage 52.

The body 59 may be divided into two parts, each of which is provided with a point 58 formed by the diagonal edges 57. In this embodiment also the baffle is preferably provided with the laterally extending flanges 54. The body 65 may be folded together along the line 66, and again the flanges may be folded outward at the point 67, which is adjacent the center of the passageway 52, and on the line of the points 58. Thus the baffle will be provided with three radially projecting portions for engaging the walls of the passageway 52, and dividing the passageway 52 into the three passageways 60 to 62, as shown in Fig. 7.

The operation of my lubricating devices may be described as follows: Any air which is present in the oil in the form of bubbles of air, which is entrapped in the oil cup 11, will ordinarily find its way to the top of the oil cup due to the lightness of the air bubbles, as contrasted with the specific weight of the lubricant; but if any air bubbles are entrained by the lubricant into the passageway 52, or if any air is entrapped in the passageway 52 at the beginning of the use of the oil cup, there is a tendency for the air to come up one of the passageways, 63 for example, while the lubricant passes down the other.

In the same way any air which is present in the reservoir 24 may pass up one of the passageways, while lubricant comes down the other by gravity. The discharge pipe 29 from the oil cup enters the reservoir at the top, where the air bubbles naturally gather, and thus the air at the top of the reservoir will tend to pass out of the conduit 29, if there is a free passageway. This free passageway is assured by means of the baffle 53 or 59, and it is found that the present structure wholly eliminates any possibility of air binding of the oil cup or reservoir.

It is found that the oil is fed under all conditions, even when there are considerable air bubbles entrained in the oil, and my theory of this action is as follows: It is inevitable, when there are air bubbles in the oil, that the weight of the lubricant on each side of the partition 53 shall be different, on account of the different random sizes of air bubbles. Thus, the side having the greater proportion of air bubbles will tend to move upward, and the other side, having the greater proportion of oil, will tend to move downward.

The existence of a point 58 at the end of the baffle is believed to make the device still more effective, because the point extends downward, and the tendency for air bubbles is to pass upward. Thus, at the end of the baffle there is a position at which any bubble would be in an unstable position, and would tend to go to one side or the other of the baffle. The embodiment having a plurality of radial partitions and passageways is peculiarly adapted to be used with the more liquid lubricants, or to be used in oil cups having larger conduits in relation to the viscosity of the lubricant.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A baffle for oil cup conduits comprising a thin strip of material adapted to extend across an oil conduit to separate it into two parts, one of which passes air in one direction, and the other of which passes lubricant in the opposite direction, said baffle having at its lower end a point forming an unstable position for air bubbles in the conduit at that point, and said baffle having at its upper end a shoulder for engaging part of an oil conduit to retain it in predetermined position.

2. In a lubricating device, an oil cup free from air binding, comprising a reservoir member carried by a conduit, said conduit extending from a lower portion of said reservoir, and a partition extending from said oil cup in said conduit, comprising a thin sheet metal member extending across from one side of said conduit to the other, and engaging the walls thereof, said partition serving to divide the oil cup conduit into two parts, one of which passes air in one direction, and the other of which passes lubricant in the opposite direction.

3. In a lubricating device, an oil cup free from air binding, comprising a reservoir member carried by a conduit, said conduit extending from a lower portion of said reservoir, and a partition extending from said oil cup in said conduit, comprising a thin sheet metal member extending across from one side of said conduit to the other, and engaging the walls thereof, said partition serving to divide the oil cup conduit into two parts, one of which passes air in one direction, and the other of which passes lubricant in the opposite direction, said conduit being substantially cylindrical, and said partition being located diametrically across the middle of said conduit.

4. In a lubricating device, an oil cup free from air binding, comprising a reservoir member carried by a conduit, said conduit extending from a lower portion of said reservoir, and a partition extending from said oil cup in said conduit, comprising a thin sheet metal member extending across from one side of said conduit to the other, and engaging the walls thereof, said partition serving to divide the oil cup conduit into two parts, one of which passes air in one direction, and the other of which passes lubricant in the opposite direction, said partition extending above the point of entry of said conduit in said oil cup, and having a laterally extending shoulder for engaging a part carried by the interior of said oil cup.

5. In a lubricating device, an oil cup free from air binding, comprising a reservoir member carried by a conduit, said conduit extending from a lower portion of said reservoir, and a partition extending from said oil cup in said conduit, comprising a thin sheet metal member extending across from one side of said conduit to the other, and engaging the walls thereof, said partition serving to divide the oil cup conduit into two parts, one of which passes air in one direction, and the other of which passes lubricant in the opposite direction, said partition extending beyond the end of said discharge conduit and being formed with a point adapted to form an unstable position for air bubbles at the entrance to said conduit whereby the bubbles will pass up one side or the other of the partition.

6. In a lubricating device, an oil cup free from air binding, comprising a reservoir member having an opening into a conduit, said conduit conducting lubricant from said reservoir by gravity, and a partition comprising a member extending transversely across said conduit from a point in said reservoir beyond the end of said conduit, whereby the lubricant is adapted to pass down one side of said partition and the air bubbles are adapted to pass up the other side of said partition to effect a free flow of lubricant through said conduit without air binding.

7. In a lubricating device, an oil cup free from air binding, comprising a reservoir and a conduit extending from said reservoir for the flow of lubricant by gravity and a partition member adapted to be inserted in said conduit and secured therein, said partition member being formed with three radially extending parts forming three chambers in said conduit, and said partition extending from a point inside said reservoir to a point beyond the end of said conduit whereby the lubricant may pass down predetermined of said conduit chambers and the air bubbles may pass up other of said conduit chambers.

8. In a lubricating device, an oil cup free from air binding, comprising a reservoir and a conduit extending from said reservoir for the flow of lubricant by gravity and a partition member adapted to be inserted in said conduit and secured therein, said partition member being formed with three radially extending parts forming three chambers in said conduit, and said partition extending from a point inside said reservoir to a point beyond the end of said conduit whereby the lubricant may pass down predetermined of said conduit chambers and the air bubbles may pass up other of said conduit chambers, said partition member comprising a piece of sheet material folded back upon itself to form one of said radially extending parts, the two flanges of said folded part diverging to form the other two radially extending parts.

9. In a lubricating device, an oil cup free from air binding, comprising a reservoir and a conduit extending from said reservoir for the flow of lubricant by gravity and a partition member adapted to be inserted in said conduit and secured therein, said partition member being formed with three radially extending parts forming three chambers in said conduit, and said partition extending from a point inside said reservoir to a point beyond the end of said conduit whereby the lubricant may pass down predetermined of said conduit chambers and the air bubbles may pass up other of said conduit chambers, said partition member being formed on its lower end with a point adapted to provide an unstable position for bubbles in the lubricant, whereby the bubbles will be forced up one or the other sides of the partition parts.

10. In a lubricating device, an oil cup free from air binding, comprising a reservoir and a conduit extending from said reservoir for the flow of lubricant by gravity and a partition member adapted to be inserted in said conduit and secured therein, said partition member being formed with three radially extending parts forming three chambers in said conduit, and said partition extending from a point inside said reservoir to a point beyond the end of said conduit whereby the lubricant may pass down predetermined of said conduit chambers and the air bubbles may pass up other of said conduit chambers, said partition member having laterally projecting flanges on its upper part in said reservoir, and providing shoulders engaging inside said reservoir to determine the position of said partition.

11. In a lubricating device, an oil cup free from air binding, comprising a reservoir and a conduit extending from said reservoir for the flow of lubricant by gravity and a partition member adapted to be inserted in said conduit and secured therein, said partition member being formed with three radially extending parts forming three chambers in said conduit, and said partition extending from a point inside said reservoir to a point beyond the end of said conduit whereby the lubricant may pass down predetermined of said conduit chambers and the air bubbles may pass up other of said conduit chambers, said partition member comprising a piece of sheet material folded back upon itself to form one of said radially extending parts, the two flanges of said folded part diverging to form the other two radially extending parts, said partition member being formed on its lower end with a point adapted to provide an unstable position for bubbles in the lubricant, whereby the bubbles will be forced up one or the other sides of the partition parts, and said partition member having laterally projecting flanges on its upper part in said reservoir and providing shoulders engaging inside said reservoir to determine the position of said partition.

ROBERT H. WHITELEY.